A. SMITH.
POCKET KNIFE.
APPLICATION FILED JUNE 24, 1920.
1,359,760.
Patented Nov. 23, 1920.
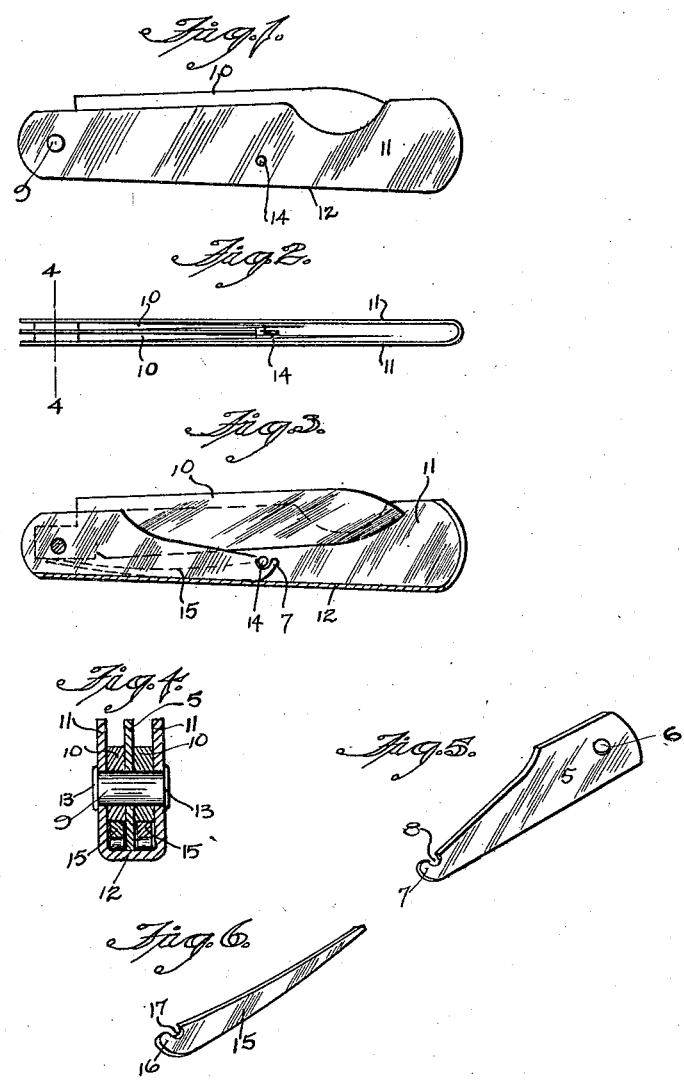
Inventor
Andrew Smith
by Seymour & Earle
atty.

UNITED STATES PATENT OFFICE.

ANDREW SMITH, OF HAMDEN, CONNECTICUT, ASSIGNOR TO WINCHESTER REPEATING ARMS CO., OF NEW HAVEN, CONNECTICUT, A CORPORATION.

POCKET-KNIFE.

1,359,760.  Specification of Letters Patent.  Patented Nov. 23, 1920.

Application filed June 24, 1920. Serial No. 391,379.

*To all whom it may concern:*

Be it known that I, ANDREW SMITH, a citizen of the United States, residing at Hamden, in the county of New Haven and State of Connecticut, have invented a new and useful Improvement in Pocket-Knives; and I do hereby declare the following, when taken in connection with the accompanying drawings and the characters of reference marked thereon, to be a full, clear, and exact description of the same, and which said drawings constitute part of this application, and represent, in—

Figure 1. A view in side elevation of a pocket-knife constructed in accordance with my invention.

Fig. 2. A plan view thereof.

Fig. 3. A view thereof in vertical longitudinal section, showing one of the two blades and the half-length center-liner.

Fig. 4. An enlarged view in transverse section on the line 4—4 of Fig. 2.

Fig. 5. A detached perspective view of the center-liner of the knife.

Fig. 6. A similar view of one of the blade-springs.

My invention relates to an improved pocket-knife of the class known to the trade as "single-ended" on account of having their blades arranged at one end rather than at both ends, the object of this invention being to simplify and reduce the cost of such knives by reducing the amount of material used in their construction.

With these ends in view, my invention consists in a single-ended pocket-knife having a plurality of blades separated by half-length center-liners.

My invention further consists in further details of construction as will be hereinafter described and pointed out in the claim.

In carrying out my invention, as herein shown, I employ a half-length center-liner or blade-separator 5 formed at one end with a perforation 6 and at its opposite end with a hook 7 produced by forming a notch 8 in its upper edge, the perforation 6 receiving the rivet 9 upon which the two spaced blades 10 are pivotally mounted and which passes through the side-plates 11 of the folded sheet-metal handle, also comprising the integral bottom 12, the projecting ends of the rivet being headed down as at 13.

The inner end of the center-liner 5 is held down in place by passing its hook 7 under a transverse rivet 14 uniting the side-plates 11 and located just enough above the bottom 12 thereof to permit the hook to be passed between the same and the rivet which enters the notch 8 in the liner, as seen in Fig. 3. The longitudinally bowed knife-blade springs 15 are arranged on opposite sides of the center-liner (Fig. 4) by means of which they are also spaced apart, these springs being stamped out of sheet-metal, arranged edgewise in the plane of the respective blades 10 and formed at their outer ends with hooks 16 produced by notching their upper edges as at 17, whereby they are adapted to be engaged with the rivet 14 and thus held against longitudinal or upward displacement. As thus arranged, the half-length center-liner spaces both the blades 10 and their springs 15 apart.

Heretofore, in knives of this character, the center-liner has extended throughout the length of the handle and required substantially twice the amount of material required for the production of my half-length center-liner, which answers every purpose of a double-length liner, whereby economy of material is secured and the knife-chamber of the handle rendered less liable to be clogged.

I claim:

A single-ended pocket-knife having a handle, a plurality of blades, springs therefor, and a half-length center-liner interposed between the said blades and springs for preventing their lateral displacement within the knife-chamber of the handle, the center-liner and springs having hook-like outer ends, and means with which the said hook-like ends of the liner and springs are engaged for holding them in place within the knife-handle.

In testimony whereof, I have signed this specification in the presence of two subscribing witnesses.

ANDREW SMITH.

Witnesses:
FRANK M. KENDRICK,
AMELIA SMITH.